(12) United States Patent
Wang et al.

(10) Patent No.: US 7,986,518 B2
(45) Date of Patent: Jul. 26, 2011

(54) OPTICAL DISK DRIVE WITH SLIDING BAR

(75) Inventors: He-Li Wang, Shenzhen (CN); Hong Li, Shenzhen (CN); Ting Zhang, Shenzhen (CN); Ting-Ting Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 312 days.

(21) Appl. No.: 12/178,646

(22) Filed: Jul. 24, 2008

(65) Prior Publication Data
US 2009/0129008 A1    May 21, 2009

(30) Foreign Application Priority Data

Nov. 19, 2007  (CN) .......................... 2007 1 0202592

(51) Int. Cl.
*H05K 5/00* (2006.01)
*H05K 7/00* (2006.01)
(52) U.S. Cl. .......... 361/679.33; 361/679.55; 361/679.58
(58) Field of Classification Search ............. 361/679.33, 361/679.55, 679.58
See application file for complete search history.

(56) References Cited

U.S. PATENT DOCUMENTS
6,937,465 B2 * 8/2005 Park .......................... 361/679.08
* cited by examiner

*Primary Examiner* — Jayprakash N Gandhi
*Assistant Examiner* — Anthony M Haughton
(74) *Attorney, Agent, or Firm* — Frank R. Niranjan (57) ABSTRACT

An optical disk drive includes a main body defining a receiving space and a pivotable cover. A latching mechanism that contacts the cover at two points distributes stresses better than where the latching mechanism only contacts the cover at one point.

14 Claims, 8 Drawing Sheets

OPTICAL DISK DRIVE WITH SLIDING BAR

BACKGROUND

1. Field of the Invention

The present invention relates to an optical disk drive, and in particular to an optical disk drive with a sliding bar for releasing or locking a cover of the optical disk drive.

2. Description of Related Art

Generally speaking, optical disk drives are used to read information stored on optical disks. Examples of optical disk drives are known as compact disk drives (CD-ROM drives) and digital versatile disk drives (DVD-ROM drives) in related art. Some optical disk drives have the additional capability of being able to write data onto an optical disk, i.e., CD-RW drivers. Optical disk drives are used in music and video playback and are implemented in recording devices and other electronic devices.

In the related art, the conventional disk drives are categorized into two types: disk-tray disk drive and cover-lifting disk drive. Regarding the cover-lifting disk drive, it usually includes a housing and a cover. The cover is pivotally coupled to the housing so that the cover can be pivoted with respect to the housing. The cover includes a protrusion extending downwardly from its free end. The housing includes a locking member formed thereon corresponding to the protrusion. When the cover is closed, the locking member is used to engage with the protrusion for the purpose of locking the cover. However, the cover is locked to the housing by only one protrusion, and a strong stress concentration is usually generated in the cover around the protrusion. There is a high possibility that a deformation is generated in the cover caused by the strong stress concentration. Even worse, the deformation of the cover may render the optical disk drive unusable.

SUMMARY

An exemplary embodiment of the present invention provides an optical disk drive. The optical disk drive includes a main body having a receiving space defined therein; a cover hingedly connected to the main body; a first latching portion and a second latching portion formed on the cover; a sliding bar disposed in the receiving space; an elastic member connecting to the sliding bar with the main body; and a button installed in the main body. The first latching portion and the second latching portion are capable of extending through the main body to engage with the sliding bar. The button and the elastic member together move lineally and reciprocatly the sliding bar so that the sliding bar engages or disengages with the first and second latching portions to lock or unlock the cover to the main body.

Other advantages and novel features of the present invention will become more apparent from the following detailed description of an embodiment when taken in conjunction with the accompanying drawings.

DETAILED DESCRIPTION

Figure 1:
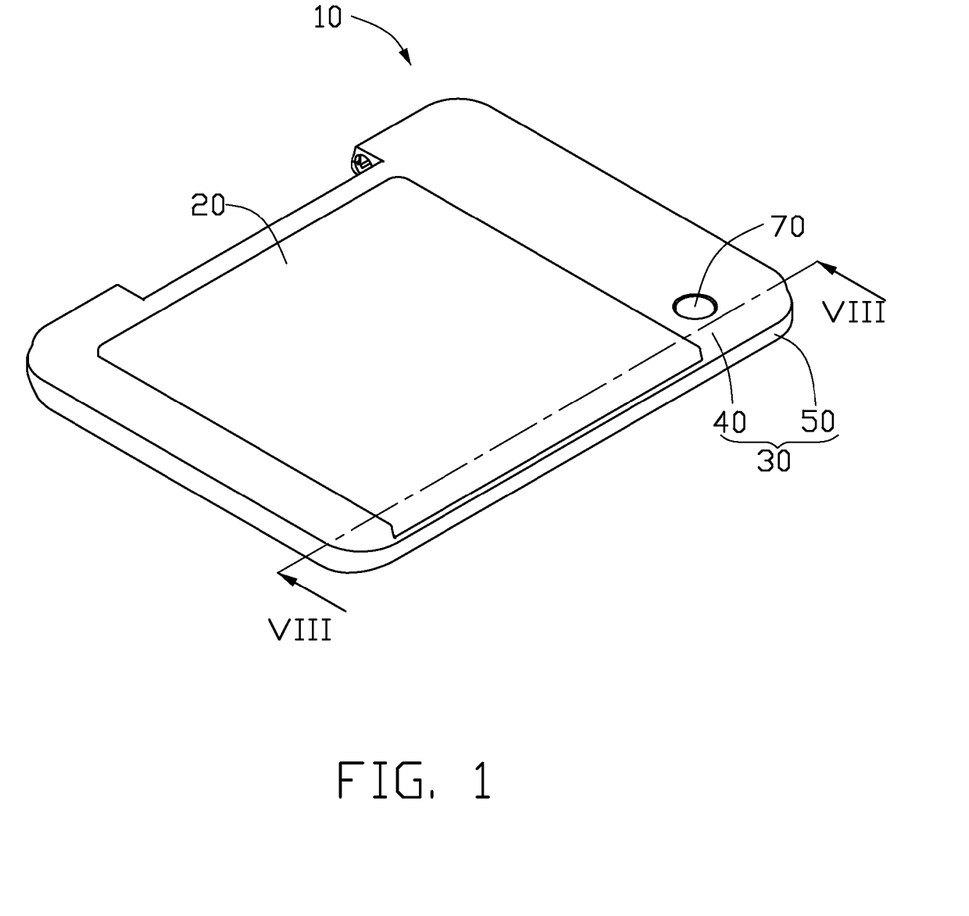
FIG. 1 is an isometric view of an optical disk drive in accordance with an embodiment of the present invention.
Figure 2:
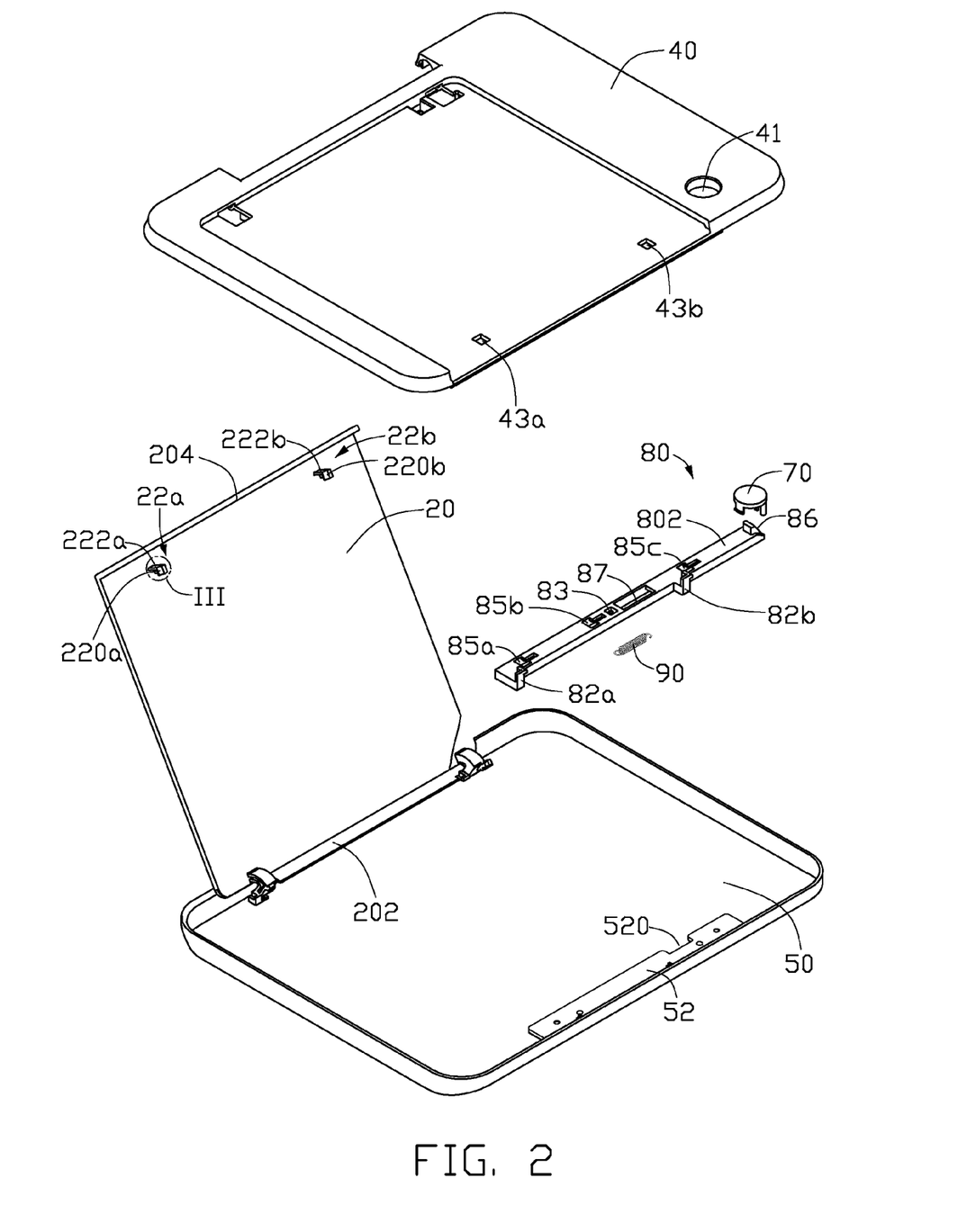
FIG. 2 is an explanatory view of the optical disk drive of FIG. 1.

Referring to FIGS. 1-2, an optical disk drive 10 according to an exemplary embodiment of the present invention is illustrated. For simplicity, an optical pickup head and other components are not depicted in the figures showing the optical disk drive 10. The optical disk drive 10 includes a cover 20 and a main body 30. The cover 20 is pivotally connected to the main body 30 via a hinge mechanism. The main body 30 includes an upper housing 40 and a lower housing 50. The upper housing 40 is detachably mounted on the lower housing 50, thus, defining a receiving space in between.

The cover 20 can be locked to the main body 30 via a locking mechanism. The locking mechanism includes a first latching portion 22a and a second latching portion 22b formed on the cover 20, a sliding bar 80 disposed in the receiving space, an elastic member 90, and a button 70 installed in the upper housing 40. The button 70 and the elastic member 90 together push the sliding bar 80 to engage or disengage the latching portions 22a, 22b to lock or unlock, respectively, the cover 20 from the main body 30.

The cover 20 includes a first edge 202 and an opposite second edge 204. The first edge 202 of the cover 20 is pivotally connected to the lower housing 50 by a hinge unit (not labeled) so the cover 20 can rotate between open and closed positions. The first latching portion 22a and the second latching portion 22b are formed adjacent the second edge 204 of the cover 20. The first latching portion 22a and the second latching portion 22b are aligned on an axis parallel to the second edge 204.

Figure 3:
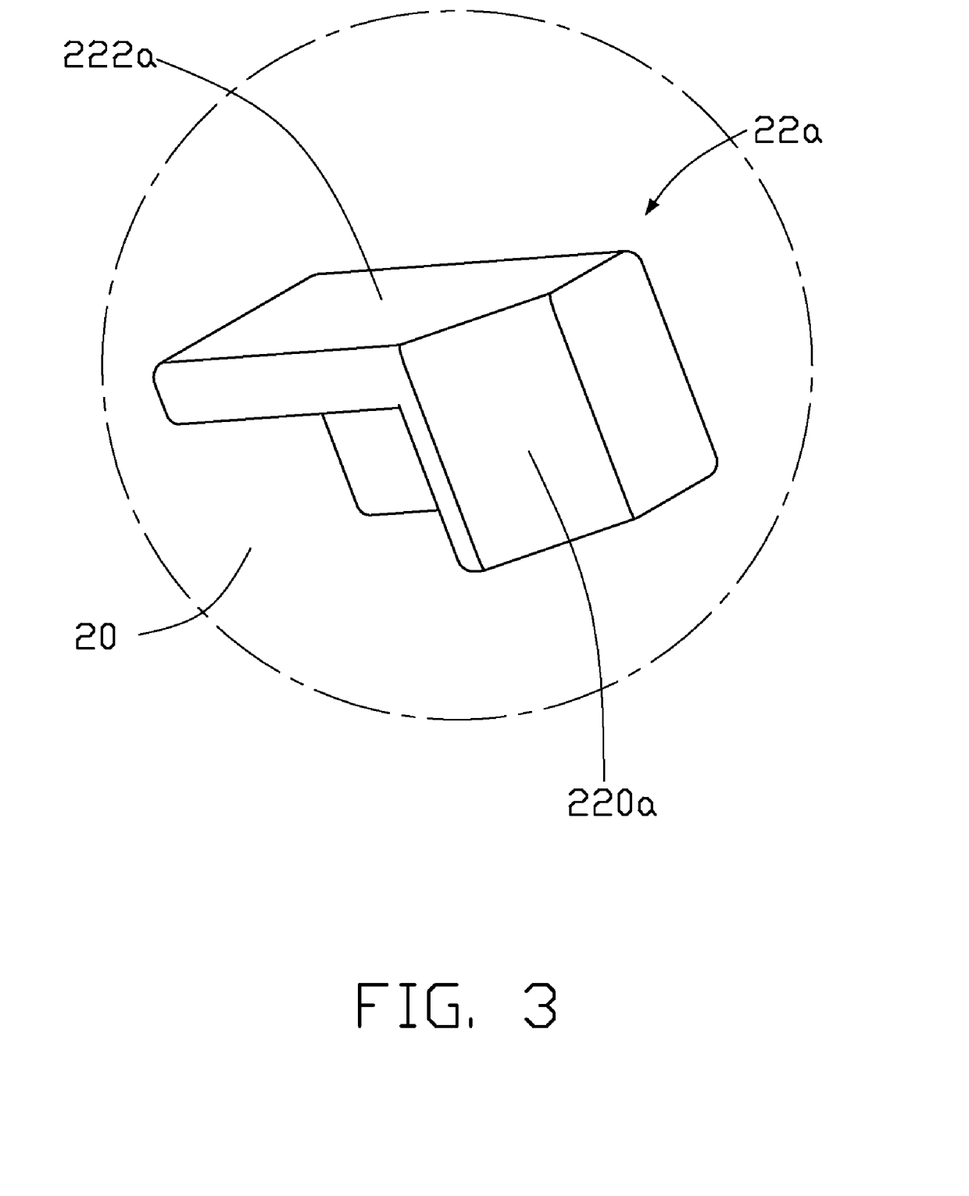
FIG. 3 is an enlarged view of a first latching portion of the optical disk drive of FIG. 2.

Referring to FIGS. 2-3, the first latching portion 22a and the second latching portion 22b each are inverted L-shape structures similar to hooks. The first latching portion 22a includes a first flat wall 222a extending from the cover 20 and a first sloping plate 220a. The first sloping plate 220a extends inwardly from a distal end of first flat wall 222a. The second latching portion 22b includes a second flat wall 222b extending from the cover 20 and a second sloping plate 220b. The second sloping plate 220b extends inwardly from a distal end of the second flat wall 222b. The first latching portion 22a and the second latching portion 22b are configured to engage with the sliding bar 80.

Figure 4:
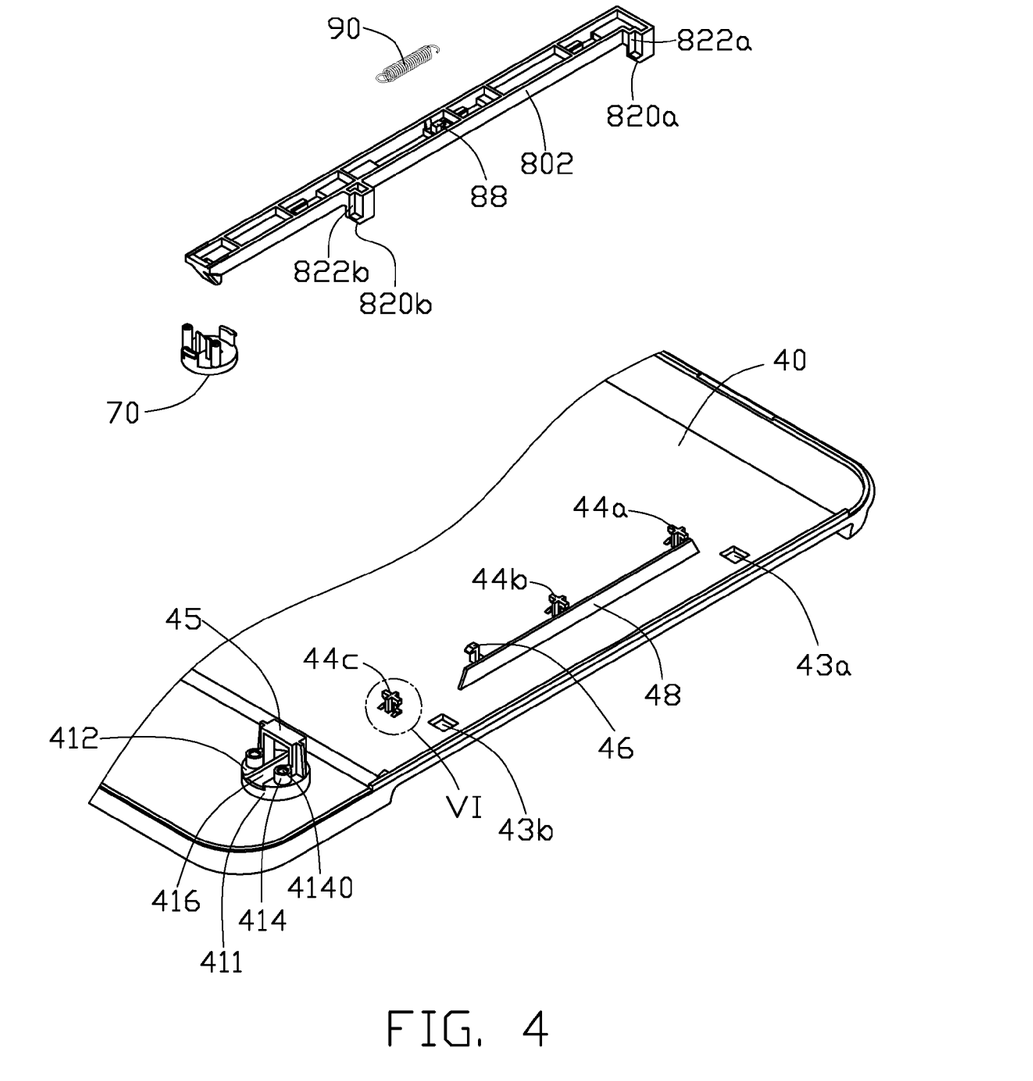
FIG. 4 is an enlarged view of an upper housing, a button, a sliding bar and an elastic member of FIG. 2 as viewed from a bottom of the upper housing.

Referring to FIG. 2 and FIG. 4, the upper housing 40 includes a first through hole 43a, a second through hole 43b, an installing hole 41 and a buckle 45. The first through hole 43a and the second through hole 43b are defined through the upper housing 40 at positions corresponding to the first latching portion 22a and the second latching portion 22b, respectively. Each of the first through hole 43a and the second through hole 43b is rectangular, and is larger than the first and second latching portions 22a, 22b so that the first and second latching portions 22a, 22b can easily extend into the first through hole 43a and the second through hole 43b, respectively.

The button hole 41 is defined in the upper housing 40 adjacent a first corner of the upper housing 40, and extending through the housing 40. A cylindrical step 411 is formed around the button hole 41 extending from a bottom surface of the housing 40. Two supporting plates 412 are formed on a distal end of the cylindrical step 411 on a same side of the bottom surface of the housing 40. A slot 416 is defined between the two supporting plates 412, and communicates with an inner space of the cylindrical step 411 and an inner space of the installing hole 41. Each of the supporting plates 412 defines a hollow pole 414 extending perpendicularly from a bottom side of the supporting plate 412 towards the lower housing 50. Each of the supporting plates 412 further defines a receiving hole 4140 communicating with the inside of the hollow pole 414. The buckle 45 has a bridge-shaped structure, which extends from one supporting plate 412 to the other supporting plate 412 and spans over the slot 416. The installing hole 41, the cylindrical step 411 and the hollow pole 414 are provided for installing the button 70.

Figure 7:
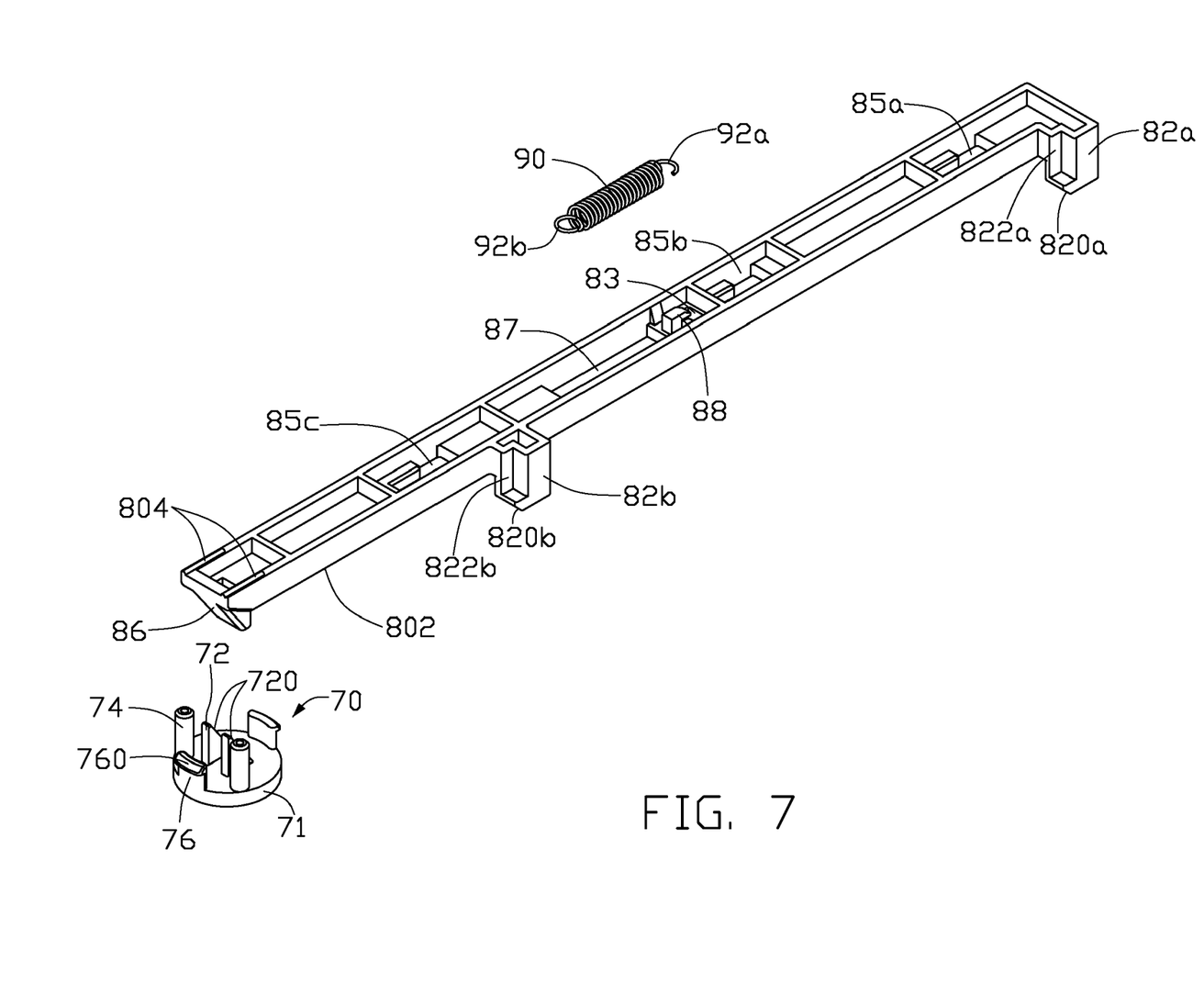
FIG. 7 is an enlarged view of the button, the sliding bar and the elastic member of FIG. 4.

Referring to FIG. 7, the button 70 includes a top plate 71, two wedge-shaped pieces 72, two cylindrical columns 74, and two clipping boards 76. The top plate 71 is disc-shaped, configured to be insertable in the installing hole 41, and for use as a pressing surface to actuate the locking mechanism. The two wedge-shaped pieces 72 are spaced from each other and extend parallelly from a central area of the top plate 71. Each of the wedge-shaped pieces 72 has an inclined surface 720. The two cylindrical columns 74 are located at one pair of opposite sides of the two wedge-shaped pieces 72, respectively. The two clipping boards 76 are located at another one pair of opposite sides of the two wedge-shaped pieces 72, respectively. In other words, the two cylindrical columns 74 and the two clipping boards 76 are arranged on a periphery of the top plate 71 in an alternating manner and 90° apart from each other. Furthermore, a catch portion 760 is formed on an outer surface of a distal end of each clipping board 76.

Figure 5:
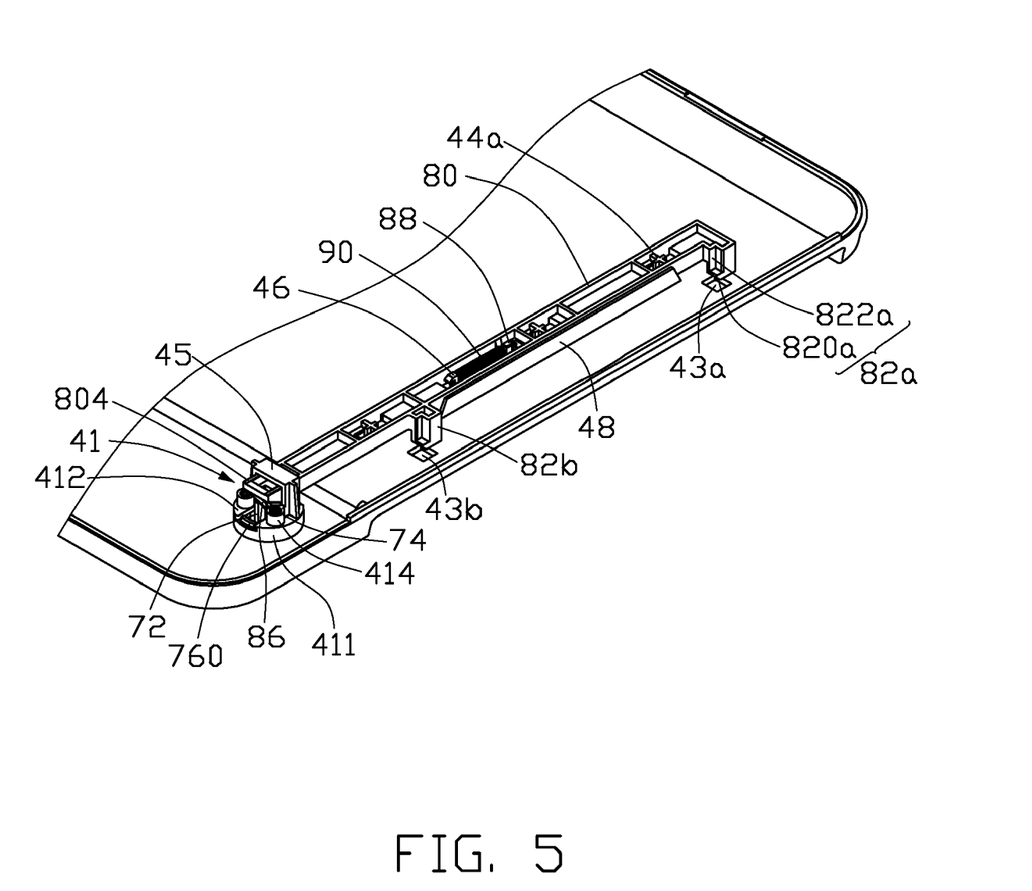
FIG. 5 is an assembled view of FIG. 4.

Referring to FIG. 1 and FIG. 5, when the button 70 is installed in the installing hole 41, a top surface of the top plate 71 is exposed from an upper side of the upper housing 40. The two cylindrical columns 74 are correspondingly inserted into the receiving holes 4140 to prevent the button 70 from rotating inside the installing hole 41. The catch portions 760 extends through the slot 416 correspondingly. When the catch portions 760 are inserted, the catch portions 760 elastically deform before the catches completely extend through the installing hole 41 and hook onto the cylindrical step 411. Therefore, the button 70 is securely installed in the installing hole 41 by engagement of the catch portions 760 and the cylindrical step 411. At this time, the two wedge-shaped pieces 72 are also inserted into the slot 416 and the inclined surfaces 720 of the two wedge-shaped pieces 72 abut the sliding bar 80.

Referring to FIGS. 4-5 and FIG. 7, an end of the sliding bar 80 has a slanted surface 86, which matches and interacts on the inclined surfaces 720. The sliding bar 80 generally includes an elongated body 802, a first clip 82a, a second clip 82b and a barb 88. The body 802 defines a first opening 83, a second opening 87, a first engaging groove 85a, a second engaging groove 85b and a third engaging groove 85c. Two spaced apart and parallel sliding rails 804 are formed on a side of the body 802 adjacent the slanted surface 86.

The first clip 82a and the second clip 82b are formed on a common side, i.e. right side (as shown in FIG. 7), of the body 802. The first clip 82a includes a first blocking plate 822a and a first guiding surface 820a. The first blocking plate 822a extends from the body 802 and is used to face the first through hole 43a of the upper housing 40 (as shown in FIG. 4). The first guiding surface 820a is formed at a distal end of the first blocking plate 822a. The first guiding surface 820a is a sloped surface so that the first latching portion 22a can easily slide upon the first guiding surface 820a to tightly engage with the first clip 82a.

The second clip 82b includes a second blocking plate 822b and a second guiding surface 820b. The second blocking plate 822b extends from the body 802 towards the second through hole 43b of the upper housing 40 (as shown in FIG. 4). The second guiding surface 820b is formed at a distal end of the second blocking plate 822b. The second guiding surface 820b is a sloped surface so that the second latching portion 22b can easily slide past the second guiding surface 820b to tightly engage with the second clip 82b.

The first engaging groove 85a, the second engaging groove 85b and the third engaging groove 85c are defined in the body 802 along its longitudinal axis. The first engaging groove 85a and the second engaging groove 85b are located between the first clip 82a and the second clip 82b. The third engaging groove 85c is located between the second clip 82b and the slanted surface 86.

The first opening 83 and the second opening 87 are located between the second engaging groove 85b and the second clip 82b. The barb 88 protrudes from the body 802 between the first opening 83 and the second opening 87.

Referring to FIG. 4, the upper housing 40 further includes a first post 44a, a second post 44b, a third post 44c, a bar 46 and a guide plate 48. The first post 44a, the second post 44b, the third post 44c and the bar 46 spaced protrude from the upper housing 40 in a line and extend towards the lowering housing 50. The guide plate 48 is a long, narrow strip, which extends perpendicularly from the upper housing 40 near the first post 44a, the second post 44b, the third post 44c and the bar 46.

Figure 6:
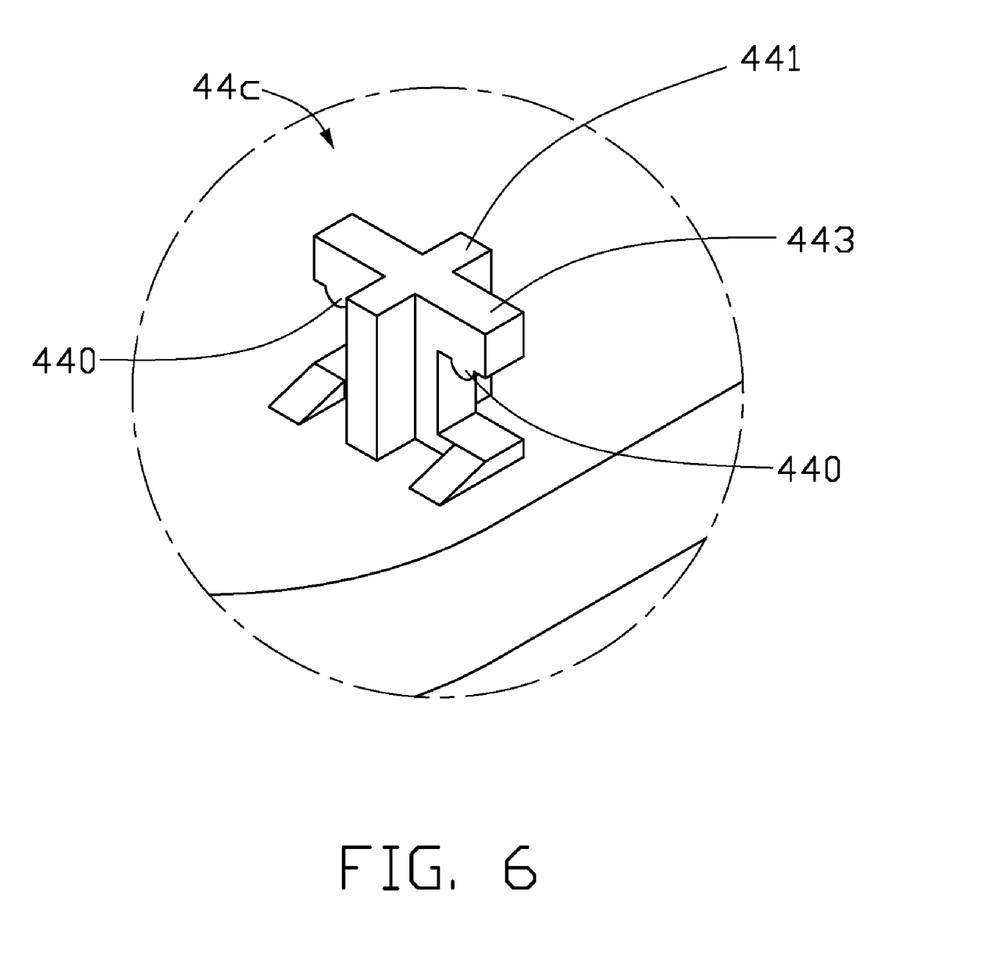
FIG. 6 is an enlarged view of a third post of the upper housing of FIG. 4.

The first post 44a, the second post 44b and the third post 44c are substantially cross-shaped. For example, referring to FIG. 6, the third post 44c includes a first beam 441 and a second beam 443. The first beam 441 is parallel to the extension direction of the guide plate 48. The second beam 443 is perpendicular to the first beam 441. Two semi-cylindrical slide-blocks 440 are formed on opposite ends of the second beam 443 and symmetrically located at opposite sides of the first beam 441. The bar 46 is located between the second post 44b and the third post 44c. The bar 46 has a hook section formed on a distal end thereof.

The elastic member 90 is an extension spring having hooks 92a, 92b formed on two ends formed respectively.

Referring to FIG. 2, a guide track 52 is mounted on the lower housing 50. A sliding groove 520 is defined in the guide track 52 for receiving the second clip 82b therein. The sliding groove 520 extends along the longitudinal direction of the body 802 to limit the sliding range of the sliding bar 80.

When the optical disk drive 10 is assembled together, the upper housing 40 is mounted on the lower housing 50 with the button 70 installed in the installing hole 41 of the upper housing 40 in a manner described above. The sliding bar 80 is located between the upper housing 40 and the lower housing 50. The first clip 82a and the second clip 82b are aligned with the first through hole 43a and the second through hole 43b respectively, to receive the first latching portion 22a and the second latching portion 22b respectively.

In detail, an end, i.e. rear end (as shown in FIG. 2) of the sliding bar 80 is inserted into the buckle 45 with the slanted surface 86 engaging with the inclined surfaces 720 of the button 70. The first post 44a, the second post 44b, the third post 44c, and the bar 46 extend into the first engaging groove 85a, the second engaging groove 85b, the third engaging groove 85c and the second opening 87, respectively, with the body 802 supported on the semi cylindrical stubs 440. In other words, the sliding bar 80 is held in position at an underside of the upper housing 40 by the first post 44a, the second post 44b, the third post 44c and the buckle 45. The body 802 can slide relative to the semi cylindrical slide-blocks 440 along the longitudinal direction of the body 802. The sliding rails 804 are in contact with the buckle 45 to decrease friction between the body 802 and the buckle 45.

The hooks 92a, 92b of the elastic member 90 are respectively engaged with the barb 88 and the bar 46 so that the elastic member 90 is stretched by the barb 88 and the bar 46 along a longitudinal direction of the body 802. The elastic member 90 applies a linear restoring force on the sliding bar 80. The restoring force pushes the sliding bar 80 towards the button 70 so the slanted surface 86 of the sliding bar 80 is kept in contact with the inclined surfaces 720 of the button 70.

Furthermore, the right side of the body 802 is attached to the guide plate 48 so that the sliding bar 80 is prevented from moving along a transverse direction of the body 802. The second clip 82b is inserted into the sliding groove 520 and can slide in the sliding groove 520 along the longitudinal direction of the body 802. Thus, the sliding range of the sliding bar 80 is limited by the sliding groove 520.

When there is need to close the cover 20, the cover 20 is rotated towards the main body 30. The first latching portion 22a and the second latching portion 22b extend through the first through hole 43a and the second through hole 43b, respectively. Then, the first sloping plate 220a and the second sloping plate 220b move close to and contact with the first guiding surface 820a and the second guiding surface 820b, respectively.

When the cover 20 continues to rotate, the first sloping plate 220a and the second sloping plate 220b slide past the first guiding surface 820a and the second guiding surface 820b, respectively. In this process, the first sloping plate 220a and the second sloping plate 220b apply a force on the first guiding surface 820a and the second guiding surface 820b. As a result, the sliding bar 80 is pushed away from the button 70 so that the first latching portion 22a and the second latching portion 22b slide past the first clip 82a and the second clip 82b, respectively. The elastic member 90 is further stretched due to the movement of the sliding bar 80. Then the elastic member 90 applies a restoring force on the sliding bar 80 to pull the sliding bar 80 back to the original position. The first latching portion 22a and the second latching portion 22b come into tight engagement with the first clip 82a and the second clip 82b, respectively. Therefore, the cover 20 is in a closed state as shown in FIG. 8.

Figure 8:
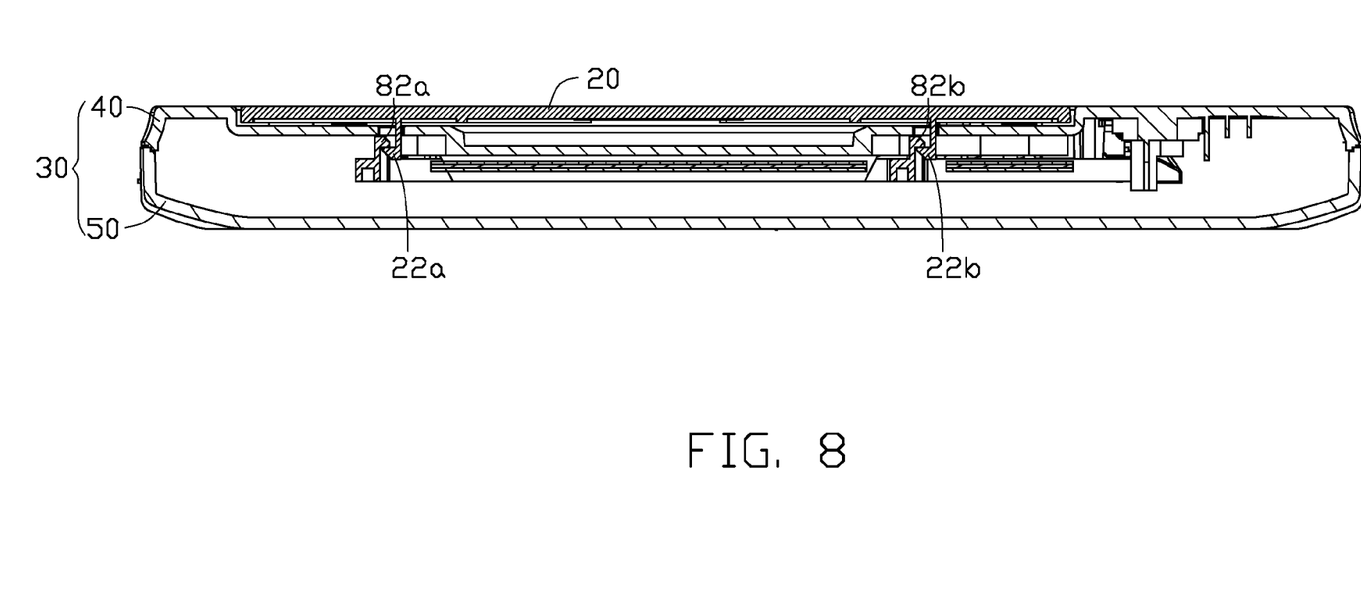
FIG. 8 is a cross sectional view of the optical disk drive of FIG. 1 taken along line VIII-VIII of FIG. 1.

Referring to FIG. 8, when there is a need to open the cover 20, a user can press the button 70 downwardly. The wedge-shaped pieces 72 of the button 70 also move downwardly. As a result, the inclined surfaces 720 of the wedge-shaped pieces 72 apply a force on the slanted surface 86 of the sliding bar 80 to cause the sliding bar 80 to move away from the button 70. The first clip 82a and the second clip 82b also move away from the button 70 so as to gradually disengage from the first latching portion 22a and the second latching portion 22b, respectively. The elastic member 90 is gradually stretched due to the movement of the sliding bar 80.

When the first clip 82a and the second clip 82b have disengaged from the first latching portion 22a and the second latching portion 22b, respectively, the first latching portion 22a and the second latching portion 22b are easily removed from the main body 30 by rotation of the cover 20. Then, the cover 20 is in an opened state.

When the button 70 is released, the elastic member 90 applies a restoring force on the sliding bar 80 to pull the sliding bar 80 back to the original position. At this state, the first clip 82a and the second clip 82b point to the first through hole 43a and the second through hole 43b again, respectively. The first clip 82a and the second clip 82b are ready for engagement with the first latching portion 22a and the second latching portion 22b again, respectively.

As described above, the cover 20 is locked to the main body 30 through the first latching portion 22a and the second latching portion 22b engagement with the sliding bar 80. Since there are two points of the cover 20 engaging with the main body 30, this greatly reduces the stress concentration on the cover 20. Thus, the possibility of deformation in the cover 20 is greatly reduced.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical disk drive comprising:
   a main body defining a receiving space therein;
   a cover hinged to the main body;
   a first latching portion and a second latching portion formed on the cover;
   a sliding bar in the receiving space;
   an elastic member connecting to the sliding bar with the main body; and
   a button installed in the main body;
   wherein the first latching portion and the second latching portion are for extending into the main body to engage with the sliding bar; and
   wherein the button and the elastic member move the sliding bar so that the sliding bar slides to engage or disengage with the first and second latching portions to lock or unlock the cover to the main body, and first directions in which the button moves are different from the second directions in which the sliding bar slides;
   wherein an installing hole is defined in the main body and the button is installed in the installing hole; the button includes a top plate, a wedge-shaped piece having an inclined surface and two clipping boards;
   wherein the two clipping boards extend into the installing hole and engage with the main body to install the button in the main body;
   wherein the wedge-shaped piece extends from the top plate and extends through the installing hole with the inclined surface contacting the sliding bar; and
   wherein a top surface of the top plate is exposed outside of the main body so when the top plate is pressed, the wedge-shaped piece of the button also moves and applies a force on the sliding bar to cause the sliding bar to move away from the button;
   wherein a tube inwardly extends from the main body around a periphery of the installing hole in the receiving space;
   two supporting plates are formed on a distal end of the tube, each supporting plate defines a receiving hole;
   a slot is defined between the two supporting plates and communicates with an inner space of the tube and an inner space of the installing hole;
   a hollow pole extends perpendicularly from a bottom of each of the supporting plates, the inside of the two hollow poles communicate with the receiving holes of the two supporting plate respectively;
   the button further includes two columns located on opposite sides of the wedge-shaped piece;

when the button is installed in the installing hole, the two columns are inserted into the two receiving holes to prevent the button from rotating relative to the main body, and the two clipping boards are extended through the slot by elastic deformation and hook at a free end of the tube, and the wedge-shaped piece is inserted into the slot with the inclined surface abutting against the sliding bar.

2. The optical disk drive as claimed in claim 1, wherein a first through hole and a second hole are defined in the main body, the first through hole and the second hole corresponding to the first latching portion and the second latching portion, respectively so that the first latching portion and the second latching portion extend through the first through hole and the second hole, respectively to engage the sliding bar.

3. The optical disk drive as claimed in claim 1, wherein the elastic member is an extension spring having two ends, each end engaged with the sliding bar and the main body.

4. The optical disk drive as claimed in claim 1, wherein a catch portion is formed on an outer surface of a distal end of each of the clipping boards, and the catch portions are extended through the slot by elastic deformation and hook at the free end of the tube.

5. The optical disk drive as claimed in claim 1, wherein the sliding bar has a slanted surface, which matches and interacts on the inclined surface.

6. The optical disk drive as claimed in claim 1, wherein a bridge-shaped buckle is formed on the main body, the buckle extends from one of the supporting plate to the other supporting plate and spans over the slot, and the sliding bar is slidably inserted into the buckle with the slanted surface contacting with the inclined surface.

7. The optical disk drive as claimed in claim 6, wherein two spaced and parallel sliding rails are formed on a side of the body and contact the buckle.

8. The optical disk drive as claimed in claim 1, The first directions are substantially perpendicular to the second directions.

9. An electronic device, comprising:
a main body;
a cover pivotally connected to the main body to selectively be in a first state locked with the main body, and a second state unlock with the main body, the cover with at least one latch;
a sliding bar mounted in the main body, the sliding bar with at least one clip, the at least one clip being locked with the at least one latch such that the cover is in the first state, and unlocked with the at least one latch such that the cover is in the second state; and
a button mounted in the main body, when the button is pressed to move in a first direction, the sliding bar being driven by the button to move in a second direction which is substantially perpendicular to the first direction such that the at least one clip changing from being locked with the at least one latch to being unlocked with the at least one latch;

wherein the main body defines an installing hole for received in the button, and a bridge-shaped buckle for fastening the button; the buckle spanning over the button; the sliding bar being slidably inserted into the buckle.

10. The electronic device according to claim 9, wherein when the button moves in the first direction, the sliding bar being moved away from the button in the second direction.

11. An optical disk drive comprising:
a main body defining a receiving space therein;
a cover hinged to the main body;
a first latching portion and a second latching portion formed on the cover;
a sliding bar in the receiving space;
an elastic member connecting to the sliding bar with the main body; and
a button installed in the main body;
wherein the first latching portion and the second latching portion are for extending into the main body to engage with the sliding bar; and
wherein the button and the elastic member move the sliding bar so that the sliding bar slides to engage or disengage with the first and second latching portions to lock or unlock the cover to the main body, and first directions in which the button moves are different from the second directions in which the sliding bar slides;
wherein the sliding bar includes an elongated body, a first clip and a second clip, the first clip and the second clip are formed on the elongated body so that the first latching portion and the second latching portion extend through the main body and engage with the first clip and the second clip, respectively;
wherein a post is formed in the main body, and the sliding bar is slidably mounted on the post;
wherein the post is cross-shaped, and includes a first beam extending from the main body and a second beam perpendicularly extending from the first beam, and the sliding bar is slidably mounted on the second beam;
wherein two slide-blocks are formed on opposite ends of the second beam and symmetrically located at opposite sides of the first beam, and the sliding bar is slidably supported on the slide-blocks.

12. The optical disk drive as claimed in claim 11, wherein a guide plate is formed in the receiving space in vicinity of the post, the guide plate contacts with one side of the sliding bar to prevent the sliding bar from deviating from its movement direction.

13. The optical disk drive as claimed in claim 11, wherein a guide track with a sliding groove is formed in the receiving space in a path of movement of the sliding bar, and the second clip is inserted into the sliding groove so that a sliding range of the sliding bar is limited by the sliding groove.

14. The optical disk drive as claimed in claim 13, wherein the sliding groove extends along the movement direction of the sliding bar.

* * * * *